US008892079B1

(12) United States Patent  
Nace et al.

(10) Patent No.: US 8,892,079 B1  
(45) Date of Patent: Nov. 18, 2014

(54) AD HOC ENDPOINT DEVICE ASSOCIATION FOR MULTIMEDIA CONFERENCING

(75) Inventors: Adam M. Nace, Bright (CA); Adam Van Ymeren, London (GB); Cameron Nicholas Alexander White, Ancaster (CA); Ertürk Diriksoy, Kitchener (CA)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 13/620,487

(22) Filed: Sep. 14, 2012

(51) Int. Cl.
*H04M 1/725* (2006.01)

(52) U.S. Cl.
USPC ...................................... 455/414.2

(58) Field of Classification Search
USPC ....................... 455/414.2; 709/204
See application file for complete search history.

(56) References Cited

U.S. PATENT DOCUMENTS

2007/0259653 A1* 11/2007 Tang et al. ............... 455/414.2
2014/0113674 A1* 4/2014 Joseph et al. ............ 455/519

* cited by examiner

*Primary Examiner* — Mohammad Islam
(74) *Attorney, Agent, or Firm* — McDermott Will & Emery LLP

(57) ABSTRACT

A system for ad hoc endpoint device association for multimedia conferencing may include one or more processors and memory. The one or more processors may prepare to provide sets of video streams corresponding to a multimedia conference to first, second, and third participant devices, where the set of videos streams prepared for each participant device includes video streams associated with the other participant devices. The one or more processors may determine that the first and second participant devices are in a same physical area and may generate, in response to the determining, a location association between the first and second participant devices for the multimedia conference. The one or more processors may exclude the video stream associated with the third participant device from set of video streams prepared for the first participant device based at least in part on the location association between the first and second participant devices.

20 Claims, 7 Drawing Sheets

AD HOC ENDPOINT DEVICE ASSOCIATION FOR MULTIMEDIA CONFERENCING

TECHNICAL FIELD

The present description relates generally to endpoint device association, and more particularly, but not exclusively, to ad hoc endpoint device association for multimedia conferencing.

BACKGROUND

Multimedia conferencing technology enables individual users located in disparate geographic locations, and operating disparate devices, e.g. devices having different operating systems, different screen resolutions, different processing capabilities, etc., to engage in a multimedia conference without the need for each user to possess expensive video conferencing equipment. In one example, a user may engage in a multimedia conference using any web browser-enabled device. In this manner, multimedia conferencing may allow users to view and hear one another, such as in order to participate in panel discussions, multi-person interviews, or classes, irrespective of the users' geographic locations and with minimal user device requirements.

SUMMARY

The disclosed subject matter relates to a computer-implemented method for ad hoc endpoint device association for multimedia conferencing. The method may include preparing, using one or more computing devices, to provide a first set of video streams corresponding to a multimedia conference to a first participant device, a second set of video streams corresponding to the multimedia conference to a second participant device, a third set of video streams corresponding to the multimedia conference to a third participant device, and a fourth set of video streams corresponding to the multimedia conference to a fourth participant device. The fourth set of video streams comprises a first video stream associated with the first participant device, a second video stream associated with the second participant device, and a third video stream associated with the third participant device. The third set of video streams comprises the first video stream associated with the first participant device, the second video stream associated with the second participant device, and a fourth video stream associated with the fourth participant device. The second set of video streams comprises the first video stream associated with the first participant device, the third video stream associated with the third participant device, and the fourth video stream associated with the fourth participant device. The first set of video streams comprises the second video stream associated with the second participant device, the third video stream associated with the third participant device, and the fourth video stream associated with the fourth participant device. The method further includes determining, using the one or more computing devices, that the first participant device and the second participant device are in a same physical area and generating, using the one or more computing devices and in response to the determining, a location association between the first participant device and the second participant device for the multimedia conference. The method further includes excluding, using the one or more computing devices, the first video stream associated with the first participant device from the fourth set of video streams, the second video stream associated with the second participant device from the third set of video streams, the first video stream associated with the first participant device and the third video stream associated with the third participant device from the second set of video streams, and the second video stream associated with the second participant device and the fourth video stream associated with the fourth participant device from the first set of video streams, based at least in part on the location association between the first participant device and the second participant device.

In another aspect, a computer-implemented method for ad hoc endpoint device association for multimedia conferencing may include preparing, using one or more computing devices, to provide a first set of video streams corresponding to a multimedia conference to a first participant device, a second set of video streams corresponding to the multimedia conference to a second participant device, and a third set of video streams corresponding to the multimedia conference to a third participant device. The third set of video streams comprises a first video stream associated with the first participant device and a second video stream associated with the second participant device. The second set of video streams comprises the first video stream associated with the first participant device and a third video stream associated with the third participant device. The first set of video streams comprises the second video stream associated with the second participant device and the third video stream associated with the third participant device. The method further includes determining, using the one or more computing devices, that the first participant device and the second participant device are in a same physical area and generating, using the one or more computing devices and in response to the determining, a location association between the first participant device and the second participant device for the multimedia conference. The method further includes excluding, using the one or more computing devices, the first video stream associated with the first participant device from the third set of video streams based at least in part on the location association between the first participant device and the second participant device.

The method may further include excluding, using the one or more computing devices, the third video stream associated with the third participant device from the first set of video streams based at least in part on the location association between the first participant device and the second participant device. The method may further include excluding, using the one or more computing devices, the first video stream associated with the first participant device from the second set of video streams and the second video stream associated with the second participant device from the first set of video streams based at least in part on the location association between the first participant device and the second participant device.

The method may further include preparing, using the one or more computing devices, to provide a first set of audio streams corresponding to the multimedia conference to the first participant device, a second set of audio streams corresponding to the multimedia conference to the second participant device, and a third set of audio streams corresponding to the multimedia conference to the third participant device, wherein the third set of audio streams comprises a first audio stream associated with the first participant device and a second audio stream associated with the second participant device, the second set of audio streams comprises the first audio stream associated with the first participant device and a third audio stream associated with the third participant device, and the first set of audio streams comprises the second audio stream associated with the second participant device and the third audio stream associated with the third participant device, and excluding, using the one or more computing devices, the first audio stream associated with the first participant device from the third set of audio streams and the second set of audio streams based at least in part on the location association between the first participant device and the second participant device.

The method may further include excluding, using the one or more computing devices, the second audio stream associated with the second participant device and the third audio stream associated with the third participant device from the first set of audio streams based at least in part on the location association between the first participant device and the second participant device. The determining, using the one or more computing devices, that the first participant device and the second participant device are in the same physical area may further comprise determining, using the one or more computing devices, that the first participant device and the second participant device are in the same physical area when the first audio stream associated with the first participant device comprises at least the portion of the second audio stream associated with the second participant device.

The method may further include determining, using the one or more computing devices, whether a first user of the first participant device and a second user of the second participant device are both visible in the first video stream or the second video stream. The excluding, using the one or more computing devices, the first video stream associated with the first participant device from the third set of video streams based at least in part on the location association between the first participant device and the second participant device may further comprises excluding, using the one or more computing devices, the first video stream associated with the first participant device from the third set of video streams based at least in part on the location association between the first participant device and the second participant device when the first user and the second user are both visible in the second video stream. The determining, using the one or more computing devices, that the first participant device and the second participant device are in the same physical area may further comprise determining, using the one or more computing devices, that the first participant device and the second participant device are in the same physical area when both the first user and the second user are determined to be visible in either the first video stream or the second video stream.

The method may further include excluding, using the one or more computing devices, the second video stream associated with the second participant device from the third set of video streams based at least in part on the location association between the first participant device and the second participant device, combining, using the one or more computing devices, the first video stream associated with the first participant device and the second video stream associated with the second participant device into a composite video stream, and adding, using the one or more computing devices, the composite video stream to the third set of video streams based at least in part on the location association between the first participant device and the second participant device The determining, using the one or more computing devices, that the first participant device and the second participant device are in the same physical area may further comprise receiving, using the one or more computing devices and over a network, an indication that the first participant device and the second participant device are in the same physical area. Alternatively, or in addition, the determining, using the one or more computing devices, that the first participant device and the second participant device are in the same physical area may further comprise determining, using the one or more computing devices, that the first participant device and the second participant device are in the same physical area based on a first geolocation of the first participant device and a second geolocation of the second device. The first participant device and the second participant device may be operated by a single user.

The first set of video streams, the second set of video streams, and the third set of video streams may each further comprise a fourth video stream associated with a fourth participant device, and the method may further include preparing, using the one or more computing devices, to provide a fourth set of video streams corresponding to the multimedia conference to the fourth participant device, wherein the fourth set of video streams comprises the first video stream associated with the first participant device, the second video stream associated with the second participant device, and the third video stream associated with the third participant device.

The method may further include excluding, using the one or more computing devices, the fourth video stream associated with the fourth participant device from the second set of video streams based at least in part on the location association between the first participant device and the second participant device, and excluding, using the one or more computing device, the second video stream associated with the second participant device from the fourth set of video streams based at least in part on the location association between the first participant device and the second participant device.

The disclosed subject matter also relates to a system for ad hoc endpoint device association for multimedia conferencing. The system may include one or more processors and a memory including instructions that, when executed by the one or more processors, cause the one or more processors to: prepare to provide a first set of video streams corresponding to a multimedia conference to a first participant device, a second set of video streams corresponding to the multimedia conference to a second participant device, and a third set of video streams corresponding to the multimedia conference to a third participant device. The third set of video streams comprises a first video stream associated with the first participant device and a second video stream associated with the second participant device. The second set of video streams comprises the first video stream associated with the first participant device and a third video stream associated with the third participant device. The first set of video streams comprises the second video stream associated with the second participant device and the third video stream associated with the third participant device. The system may further include instructions that, when executed by the one or more processors, cause the one or more processors to determine that the first participant device and the second participant device are in a same physical area, generate, in response to the determine, a location association between the first participant device and the second participant device for the multimedia conference, and exclude the third video stream associated with the third participant device from the first set of video streams based at least in part on the location association between the first participant device and the second participant device.

The system may further include instructions that, when executed by the one or more processors, cause the one or more processors to exclude the first video stream associated with the first participant device from the third set of video streams based at least in part on the location association between the first participant device and the second participant device. The system may further include instructions that, when executed by the one or more processors, cause the one or more processors to exclude the first video stream associated with the first participant device from the second set of video streams and the second video stream associated with the second participant device from the first set of video streams based at least in part on the location association between the first participant device and the second participant device.

The system may further include instructions that, when executed by the one or more processors, cause the one or more processors to: determine whether a first user of the first participant device and a second user of the second participant device are visible in both the first video stream associated with the first participant device or the second video stream associated with the second participant device, and determine that the first participant device and the second participant device are in the same physical area when the first user and the second user are both visible in either the first video stream associated with the first participant device or the second video stream associated with the second participant device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
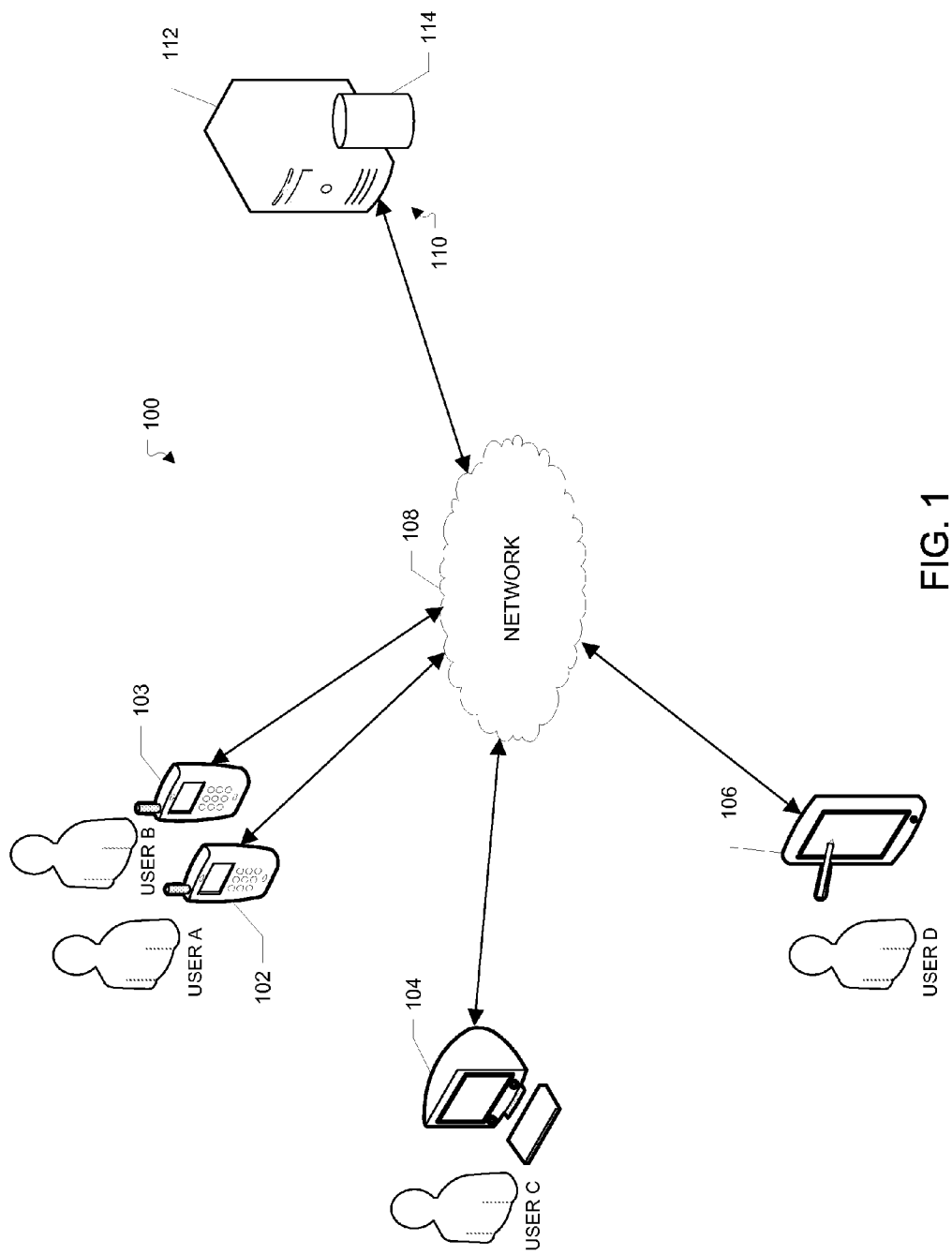
FIG. 1 illustrates an example client-server network environment that may implement ad hoc endpoint device association for multimedia conferencing.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In some instances, a user may participate in a multimedia conference using a single-head endpoint device which may be a device that includes a single audio and/or video output device, such as a single display, and/or a single audio and/or video input device, such as a single camera and microphone. Alternatively, a user may participate in a multimedia conference using a multi-head endpoint device which may be a device that includes multiple audio and/or video output devices, such as multiple displays, and/or multiple audio and/or video input devices, such as multiple cameras and/or microphones. For example, a multi-head endpoint device may include an individual display and associated camera dedicated to each of the other participants in a multimedia conference. Accordingly, each individual display may be dedicated to a video stream of one of the other participants in the multimedia conference. In addition, each of the other participants may exclusively receive a video stream captured by the camera that is associated with the display dedicated to their video stream.

The individual displays and cameras of the multi-head endpoint device may allow a user interacting with the multi-head endpoint device to make virtual eye-contact, and/or make any other non-verbal cues, with any of the other participants in the multimedia conference, such as by looking at the display and camera associated with one of the other participants. For example, since individual cameras are dedicated to each of the other participants, only one of the other participants will receive a video stream that shows that the user looking directly at them, while the other participants will receive a video stream showing the user looking away from them. Furthermore, since the video streams of the other participants in the multimedia conference are presented on separate displays, each video stream can be displayed in full screen, rather than sharing a portion of a display with one or more other video streams.

Thus, a multi-head endpoint device may provide for an enhanced user experience in a multimedia conference. However, a dedicated multi-head endpoint device may require expensive hardware, such as multiple displays, multiple cameras, and extensive processing resources required to manage/control the multiple displays and cameras. Furthermore, configuring the individual displays and cameras to operate jointly as a multi-head endpoint device may be complex and time-consuming.

Accordingly, it may be desirable to provide users with a low-cost and easily configurable multi-head endpoint solution that may provide for an enhanced user experience in a multimedia conference. As previously discussed, hosted multimedia conferencing technology may allow users to participate in a multimedia conference using their mobile devices. The mobile devices may individually include high quality output devices, such as displays and speakers, and high quality input devices, such as cameras and microphones, that may have specifications comparable to a dedicated single-head endpoint device. As such, it may be desirable to combine multiple collocated mobile devices that are participating in a multimedia conference, such as mobile devices that are in the same physical area, to form an ad hoc multi-device endpoint.

In a system providing ad hoc endpoint device association for multimedia conferencing, multiple participant devices that are proximally located, such as located in the same physical area, may be associated together to function as a single multi-head endpoint in a multimedia conference. In this manner, users may benefit from the enhanced user experience provided by a multi-head endpoint without needing expensive hardware or complex and time-consuming device configuration. The users' experience in the multimedia conference may be enhanced by effectively combining the displays and audio output devices of their mobile devices, thereby allowing for more screen space for the video streams corresponding to each of the other participants in the multimedia conference. For example, if two mobile devices are combined to form a multi-head endpoint, the audio and/or video streams corresponding to half of the participant devices may be displayed on one of the mobile devices and the audio and/or video streams corresponding to the other half of the participant devices may be displayed on the other mobile device. In addition, if each of the mobile devices includes a separate camera, the other participants in the multimedia conference may be provided with an audio and/or video stream captured from the mobile device that is displaying their audio and/or video stream. In this manner, the users interacting with the multi-head endpoint may be able to make virtual eye-contact, or other non-verbal cues, directed to at least half of the other participants in the multimedia conference.

In one example, a server providing a hosted multimedia conference to multiple participant devices may determine that two of the participant devices are collocated, such as located in the same physical area. The server may determine that the devices are collocated, for example, by analyzing geolocations of the participant devices and/or analyzing audio and/or video streams received from the participant devices. For example, the server may analyze the audio and/or video streams received from two participant devices to determine whether the audio and/or video streams include overlapping content, e.g. whether both of the audio streams include the same audio objects, or whether both of the video streams include the same video objects.

Alternatively, the server may receive a communication from one of the participant devices that indicates that the participant device is collocated with another one of the participant devices in the multimedia conference. For example, a participant device may receive a signal from another participant device, such as a near field communication signal, a Bluetooth signal, or an infrared signal. Since these signals are generally only transmitted over short distances, the reception of the signal by the participant device may be indicative of another participant device being collocated, such as located within the same physical area. Alternatively, or in addition, one of the participant devices may generate a short, easily recognizable audio signal, and if the audio signal is detected by another participant device, then the participant devices could determine that they are in proximity. Alternatively, or in addition, the participant devices may determine that they are in proximity based on similar strengths of signal to the same wireless base station, such as a wireless switch, a wireless router, or a cellular communications base station.

Upon determining that a first participant device and a second participant device are collocated, the server may create a location association between the first participant device and the second participant device in the context of the multimedia conference. For example, the server may modify parameters of the multimedia conference to reflect that the first and second participant devices are participating in the multimedia conference as a single multi-head endpoint. Since the users interacting with the first and second participant devices may be able to view the displays of both participant devices and hear the audio output of both participant devices, the server may provide the first participant device with audio and/or video streams corresponding to some of the other participant devices in the multimedia conference, such as half of the other participant devices in the multimedia conference, and the server may provide the second participant device with video streams corresponding to the remaining participant devices in the multimedia conference, such as the other half of the participant devices in the multimedia conference. Since the first and second participant devices each present audio and/or video streams for only some of the other participant devices, such as half of the other participant devices, the server can conserve bandwidth by only transmitting the audio and/or video streams to the first and second device that will be presented by the first and second participant device, respectively. In one example, if the first participant device has a larger display area, such as a larger screen, than the second participant device, then the server may provide the first participant device with audio and/or video streams corresponding to a larger portion of the other participant devices in the multimedia conference than the second participant device.

Alternatively, or in addition, if the user interacting with the first participant device is not able to view the display of the second participant device, the server may provide all of the video streams to the first participant device. Similarly, if the user interacting with the first participant device is not able to hear the audio output of the second participant device, e.g. if the user is wearing headphones, then the server may provide all of the audio streams to the first participant device.

Similarly, since the users interacting with the participant devices may be viewable in the video streams of both of the participant devices, the server may transmit the video stream of the first participant device to only the participant devices whose video stream is displayed on the first participant device and the server may transmit the video stream of the second participant device to only the participant devices whose video stream is displayed on the second participant device. In this manner, if the user of the first participant device faces the camera of the second participant device to communicate, it will appear to the users of the participant devices whose video stream is displayed on the first participant device that the user is turning away from them. Thus, there may be a non-verbal cue that the user is communicating to one of the participant devices whose video stream is displayed on the second participant device. Conversely, if the user of the first participant device faces the camera of the first participant device to communicate, there may be a non-verbal cue that the user is communicating to a user of one of the participant devices whose video stream is displayed on the first participant device. In addition, the server may combine the audio streams received from the first and second participant device to create a virtual stereo audio stream to provide to each of the other participant devices.

The location association between the first and second participant devices in the context of the multimedia conference may be maintained by the server for as long as the devices remain collocated, such as located within the same physical area. If the server determines that the first and second participant devices are no longer collocated, the server may remove the location association between the devices. In this example, the server may modify the multimedia conference such that the first and second participant devices participate in the multimedia conference as single head devices when the location association between the devices is removed. Alternatively, or in addition, the server may provide a confirmation message to the first and/or second participant device prior to removing the location association, in order to confirm that that the devices are no longer collocated.

In another example, a single user may operate both the first and second participant devices. In this example, the first and second participant devices may collaborate to provide an additional camera, such that the user may provide an additional video stream for the multimedia conference. For example, a user may use the camera associated with their desktop computer to provide a primary video stream for the multimedia conference, and the user may use the camera of their mobile device to provide an auxiliary video stream for the multimedia conference. The auxiliary video stream may be a video stream that captures an external event, an external object, or another person. In one example, the server may combine the video streams from the first and second participant devices to generate a composite video stream, and the server may provide the composite video stream to the other participant devices. For example, the server may generate the composite video stream by overlaying a small window containing the video stream from the user's desktop computer onto a larger video stream from the user's mobile device.

In another example, the first and second participant devices may establish a direct peer-to-peer connection through one or more communication interfaces, such as a Bluetooth interface, an infrared interface, a wireless interface, or generally any communication interface capable of establishing a direct peer-to-peer connection. Once the peer-to-peer connection is established, the first and second participant devices may collaborate with one another to optimize the transmission of audio and/or video streams to and/or from the server. For example, the first and second participant devices may analyze one or more characteristics of the network connections used by the first and second participant devices to communicate with the server, such as uplink bandwidth availability, downlink bandwidth availability, channel conditions, or generally any characteristic that may affect the network connections. The first and second participant devices may then collaborate with one another over the peer-to-peer connection in order to adaptively switch between the network connections, based on the aforementioned characteristics of the network connections, while participating in the multimedia conference. For example, if the first participant device is experiencing poor channel conditions or low bandwidth availability while participating in the multimedia conference, the communications between the first participant and the server may be routed through the network connection of the second participant device, via the peer-to-peer connection. In this manner, the first and second participant devices may collaborate to provide enhanced connectivity with the server through the network connection of either device.

For explanatory purposes, the description herein generally references forming a multi-head endpoint using two participant devices that are located in the same physical area. However, a multi-head endpoint may be formed from any number of participant devices that are located in the same physical area.

FIG. 1 illustrates an example client-server network environment which may implement ad hoc endpoint device association for multimedia conferencing. Not all of the depicted components may be required, however, and some implementations may include additional components not shown in the figure. Variations in the arrangement and type of the components may be made without departing from the spirit or scope of the claims as set forth herein. Additional, different or fewer components may be provided.

Network environment 100 may include a number of electronic devices 102, 103, 104, 106 communicably connected to server 110, such as by network 108. In another example, electronic devices 102, 103, 104, 106 may be communicably connected to one another, such as by network 108, but not communicably connected to server 110. Alternatively, or in addition, electronic devices 102, 103 may be located within the same physical area and may be communicably connected to one another, such as though a near field communication connection, a Bluetooth connection, an infrared connection, and/or generally any connection protocol that may communicably connect devices located within the same physical area.

Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 103, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used for participating in a multimedia conference, such as by displaying a web page. In the example of FIG. 1, electronic devices 102, 103 are depicted as smart phones, electronic device 104 is depicted as a desktop computer, and electronic device 106 is depicted as a tablet device.

In one example, server 110 includes one or more processing devices 112 and data store 114. The one or more processing devices 112 execute computer instructions stored in data store 114, for example, to provide a system for ad hoc endpoint device association for multimedia conferencing to one or more of electronic devices 102, 103, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 103, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 103, 104, 106 and server 110. In another example, electronic devices 102, 103, 104, 106 may be in communication with one another without communicating with server 110, such as through near field communication signals, Bluetooth signals, and/or infrared signals.

Users interacting with electronic devices 102, 103, 104, 106 may participate in a multimedia conference. The phrase "multimedia conference" as used herein encompasses its plain and ordinary meaning and, if not otherwise included in its plain and ordinary meaning, may also refer to an audio and/or video conference between two or more of electronic devices 102, 103, 104, 106, where at least some of electronic devices 102, 103, 104, 106 transmits an audio and/or video stream, and at least some of electronic devices 102, 103, 104, 106 receives an audio and/or video stream from at least one other of electronic devices 102, 103, 104, 106. Accordingly, electronic devices 102, 103, 104, 106, may include, or may be coupled to, a camera, a microphone, or other devices for capturing video and/or audio, and may include, or may be coupled to, an output device for presenting a video stream and/or an output device for presenting an audio stream, such as a display and/or speakers.

Electronic devices 102, 103, 104, 106 may also be referred to as endpoint devices. The phrase "endpoint device" as used herein encompasses its plain and ordinary meaning and, if not otherwise included in its plain and ordinary meaning, may also refer to any device that is capable of participating in a multimedia conference, such as any device that is capable of providing an audio stream and/or a video stream to another device and/or receiving an audio stream and/or a video stream from another device.

In one example electronic devices 102, 103, 104, 106 may establish a multimedia conference session with server 110 in order to participate in a multimedia conference. The phrase "multimedia conference session" as used herein encompasses its plain and ordinary meaning and, if not otherwise included in its plain and ordinary meaning, may also refer to interactions between electronic devices 102, 103, 104, 106 and server 110 with regards to a multimedia conference, and any data, state information, and/or control information associated with the interactions.

In one example, if users interacting with electronic devices 102, 103, 104, 106 are participating in a multimedia conference hosted by server 110, one or more of electronic devices 102, 103, 104, 106, may transmit audio streams and/or video streams to server 110. The phrase "hosting device" as used herein encompasses its plain and ordinary meaning and, if not otherwise included in its plain and ordinary meaning, may also refer to a device that is hosting a multimedia conference. The hosting device, such as server 110, may transmit, or may prepare to transmit, sets of the audio and/or video streams of the one or more electronic devices 102, 103, 104, 106 to the other electronic devices 102, 103, 104, 106.

In operation, server 110 may provide a multimedia conference to electronic devices 102, 103, 104, 106 such as by hosting the multimedia conference. Electronic devices 102, 103, 104, 106 may each establish a multimedia conference session with server 110, for purposes of participating in the multimedia conference. In one example, server 110 may determine that electronic devices 102, 103 are collocated, such as located within the same physical area. Server 110 may transmit a notification to electronic devices 102, 103 requesting confirmation of whether electronic devices 102, 103 would like to participate in the multimedia conference as a multi-head endpoint.

If electronic devices 102, 103 indicate that they would like to participate in the multimedia conference as a multi-head endpoint, server 110 may generate a location association between electronic devices 102, 103 for the multimedia conference, such as by generating an association between the multimedia conference sessions of electronic devices 102, 103. In one example, server 110 may store the location association in data store 114. The location association may allow server 110 to handle communications from, and send control signaling to, electronic devices 102, 103, such that electronic devices 102, 103 may participate in the multimedia conference as an ad hoc multi-head endpoint. An example process for ad hoc endpoint device association that includes a server device determining that participant devices are collocated is discussed further with regards to FIG. 2 below.

In one example, electronic devices 102, 103 may determine that they are collocated with one another, such as located within the same physical area. For example, electronic device 102 may receive a near field communication signal, a Bluetooth signal, and/or an infrared signal from electronic device 103, which may indicate that the electronic devices 102, 103 are collocated. In this example, upon receiving confirmation from the users interacting with electronic devices 102, 103 that electronic devices 102, 103 should participate in the multimedia conference as a multi-head endpoint, one or more of electronic devices 102, 103 may transmit an indication to server 110 that indicates the electronic devices 102, 103 would like to participate in the multimedia conference as a multi-head endpoint. Server 110 may then generate a location association between electronic devices 102, 103 and may store the location association, such as in data store 114. An example process for ad hoc endpoint device association that includes participant devices determining that they are collocated is discussed further with regards to FIG. 3 below.

In one example, the modification of the parameters associated with the multimedia conference may result in the modification of the sets of audio and/or video streams being transmitted, or being prepared for transmission, to at least some of electronic devices 102, 103, 104, 106. For example, since the users interacting with electronic devices 102, 103 may be able to view the displays and hear the audio output devices of both electronic devices 102, 103, it may not be necessary for server 110 to provide the audio and/or video streams corresponding to all of the other electronic devices 104, 106 to both electronic devices 102, 103. Thus, server 110 may provide electronic device 102 with audio and/or video streams corresponding to a first portion of the other electronic devices 104, 106, such as electronic device 104, and server 110 may provide electronic device 103 with audio and/or video streams corresponding to the remaining portion of the electronic devices 104, 106, such as electronic device 106. In other words, server 110 may exclude the audio and/or video streams corresponding to electronic device 106 from the set of audio and/or video streams provided to, or prepared to be provided to, electronic device 102, and server 110 may exclude the audio and/or video streams corresponding to electronic device 104 from the set of audio and/or video streams provided to, or prepared to be provided to, electronic device 103.

Similarly, since the users interacting with electronic devices 102, 103 may be audible and/or visible in the audio and/or video streams of both of electronic devices 102, 103, server 110 may transmit the audio and/or video stream of electronic device 102 to only the other electronic devices 104, 106 whose audio and/or video stream is presented on electronic device 102, such as electronic device 104, and server 110 may transmit the audio and/or video stream of electronic device 103 to only the electronic devices 104, 106 whose audio and/or video stream is presented on electronic device 103, such as electronic device 106. In other words, server 110 may exclude the audio and/or video streams corresponding to electronic device 103 from the set of audio and/or video streams provided to, or prepared to be provided to, electronic device 104, and server 110 may exclude the audio and/or video streams corresponding to electronic device 102 from the set of audio and/or video streams provided to, or prepared to be provided to, electronic device 106.

An example process for ad hoc endpoint device association that includes modifying the sets of audio and/or video streams transmitted, or prepared to be transmitted, to at least some of the participant devices is discussed further with regards to FIG. 4 below. In addition, an example use case for ad hoc endpoint device association that includes transmitting different audio and/or video streams to different participant devices is described with regards to FIG. 5 below, and example user interfaces that illustrate different video streams being transmitted to participant devices are discussed with regards to FIG. 6 below.

Figure 2:
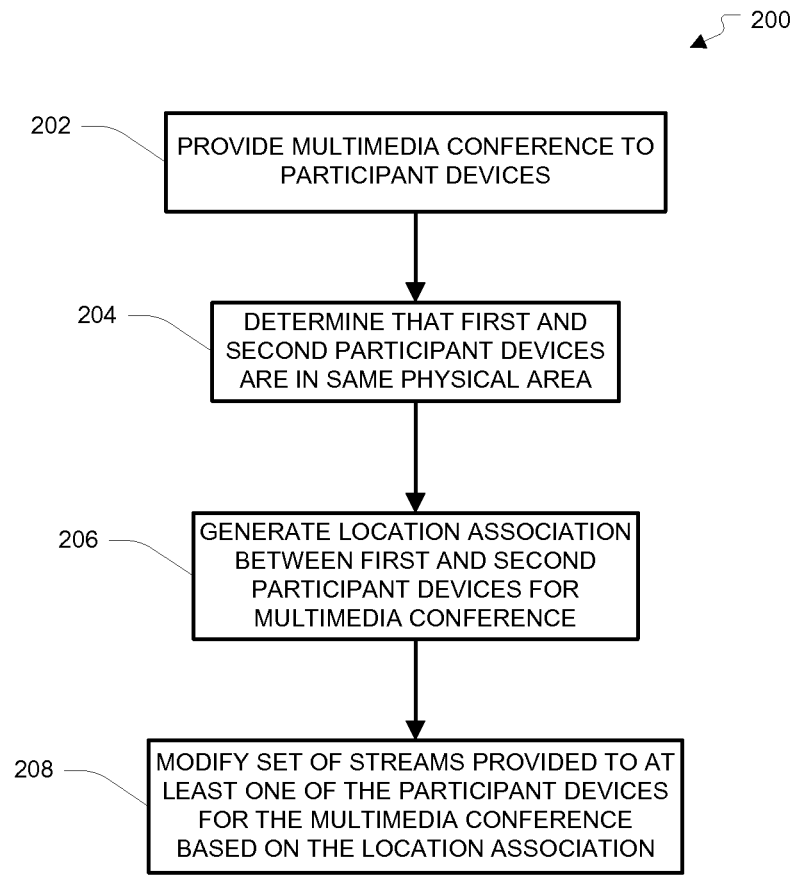
FIG. 2 illustrates a flow diagram of an example process for ad hoc endpoint device association for multimedia conferencing.

FIG. 2 illustrates a flow diagram of an example process 200 for ad hoc endpoint device association for multimedia conferencing. For explanatory purposes, example process 200 is described herein with reference to the example network environment 100 of FIG. 1; however, example process 200 is not limited to the example network environment 100 of FIG. 1. Further for explanatory purposes, the blocks of example process 200 are described herein as occurring in serial, or linearly. However, multiple blocks of example process 200 may occur in parallel.

In block 202, a hosting device, such as server 110, provides a multimedia conference, or other hosted service, to one or more participant devices, such as electronic devices 102, 103, 104, 106. For example, electronic devices 102, 103, 104, 106 may each establish an individual multimedia conference session with server 110. Server 110 may receive audio and/or video streams from one or more of electronic devices 102, 103, 104, 106 and server 110 may provide, or prepare to provide, the received audio and/or video streams to the other electronic devices 102, 103, 104, 106. Thus, server 110 may provide, or prepare to provide, a set of audio and/or video streams to each of electronic devices 102, 103, 104, 106, where the set of audio and/or video streams correspond to one or more of the other electronic devices 102, 103, 104, 106.

In one example, server 110 may prepare to provide a set of audio and/or video streams to electronic device 102 that includes audio and/or video streams that correspond to, or are associated with, electronic devices 103, 104, 106. Server 110 may also prepare to provide a set of audio and/or video streams to electronic device 103 that includes audio and/or video streams that correspond to electronic devices 102, 104, 106. Server 110 may also prepare to provide a set of audio and/or video streams to electronic device 104 that includes audio and/or video streams that correspond to electronic devices 102, 103, 106. Lastly, server 110 may prepare to provide a set of audio and/or video streams to electronic device 106 that includes audio and/or video streams that correspond to electronic devices 102, 103, 104.

In block 204, server 110 determines that two of the participant devices, such as electronic devices 102, 103 are in the same physical area. For example, server 110 may determine that electronic devices 102, 103 are in the same physical area by analyzing geolocations of electronic devices 102, 103, and/or by analyzing the audio and/or video streams received from electronic devices 102, 103 to determine whether the audio and/or video streams include overlapping content, e.g. whether both of the audio streams include the same audio objects, or whether both of the video streams include the same video objects.

In block 206, server 110 generates a location association between electronic devices 102, 103 for the multimedia conference. For example, server 110 may store a location association between the multimedia conference sessions of electronic devices 102, 103 in data store 114. Alternatively, or in addition, server 110 may store a location association in each of the multimedia conference sessions of electronic devices 102, 103, such as by setting a parameter in each of the multimedia conference sessions of electronic devices 102, 103 that indicates that electronic devices 102, 103 are participating in the multimedia conference as a multi-head endpoint.

In block 208, server 110 modifies the set of audio and/or video streams that are provided to at least one of the participant devices for the multimedia conference based on the location association. For example, since the users interacting with electronic devices 102, 103 may be able to view and hear each other, in addition to being able to view the displays and/or hear the audio output of both electronic devices 102, 103, server 110 may modify the set of audio and/or video streams provided to electronic devices 102, 103 such that electronic device 102 is provided with audio and/or video streams corresponding to a first portion of the other electronic devices 104, 106, such as electronic device 104, and electronic device 103 is provided with audio and/or video streams corresponding to the remaining portion of the electronic devices 104, 106, such as electronic device 106. In other words, server 110 may modify the set of audio and/or video streams provided to, or prepared to be provided to, electronic device 102 to exclude the audio and/or video streams corresponding to electronic devices 103, 106, and server 110 may modify the set of audio and/or video streams provided to, or prepared to be provided to, electronic device 103 to exclude the audio and/or video streams corresponding to electronic devices 102, 104.

Similarly, since the users interacting with electronic devices 102, 103 may be audible and/or visible in the audio and/or video streams received from both of electronic devices 102, 103, server 110 may modify the set of audio and/or video streams provided to electronic devices 104, 106 such that the audio and/or video stream of electronic device 102 is only provided to the other electronic devices 104, 106 whose audio and/or video streams are presented on electronic device 102, such as electronic device 104, and such that the audio and/or video stream of electronic device 103 is only provided to the electronic devices 104, 106 whose audio and/or video streams are presented on the electronic device 103, such as electronic device 106. In other words, server 110 may modify the set of audio and/or video streams provided to, or prepared to be provided to, electronic device 104 to exclude the audio and/or video streams corresponding to electronic device 103 and server 110 may modify the set of audio and/or video streams provided to, or prepared to be provided to, electronic device 106 to exclude the audio and/or video streams corresponding to electronic device 102.

Figure 3:
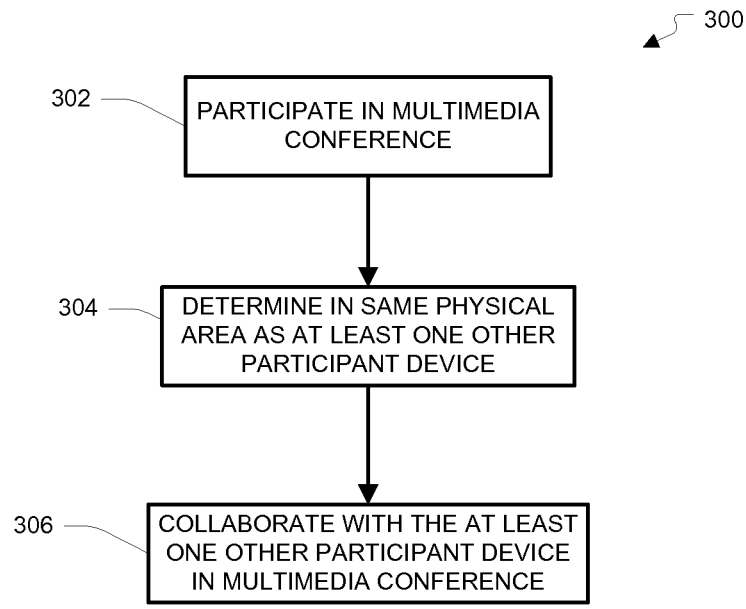
FIG. 3 illustrates a flow diagram of an example process for ad hoc endpoint device association for multimedia conferencing.

FIG. 3 illustrates a flow diagram of an example process 300 for ad hoc endpoint device association for multimedia conferencing. For explanatory purposes, example process 300 is described herein with reference to the example network environment 100 of FIG. 1; however, example process 300 is not limited to the example network environment 100 of FIG. 1. Further for explanatory purposes, the blocks of example process 300 are described herein as occurring in serial, or linearly. However, multiple blocks of example process 300 may occur in parallel.

In block 302, a user participates in a multimedia conference hosted by a hosting device, such as server 110, by initiating a multimedia conference session using a participant device, such as electronic device 102. For example, the user may initiate the multimedia conference session with server 110. In block 304, electronic device 102 determines that it is in the same physical area as at least one other participant device of the multimedia conference, such as electronic device 103. For example, electronic device 102 may scan for other participant devices using one or more out-of-band communications, e.g. by transmitting or receiving a signal directly to/from electronic device 103, such as a near field communication signal, a Bluetooth signal, and/or a infrared signal. Alternatively, or in addition, if the user interacting with electronic device 103 has granted permission to share their location coordinates, then electronic device 102 may receive the location coordinates of electronic device 103. In this instance, electronic device 102 may determine, based on its own location coordinates and the location coordinates of electronic device 103, that electronic device 102 is in the same physical area as electronic device 103.

In block 306, electronic device 102 collaborates with electronic device 103 in the multimedia conference. For example, electronic device 102 may transmit a request to electronic device 103 in order to request that electronic device 103 collaborate with electronic device 102 in the multimedia conference, such as by participating in the multimedia conference with electronic device 102 as a multi-head endpoint. If electronic device 103 accepts the request, then electronic devices 102, 103 may collaborate with one another in the multimedia conference, such as by jointly operating as a multi-head endpoint, and/or by sharing resources in any other manner. In one example, electronic devices 102, 103 may directly negotiate with one another in order to transition to operating as the multi-head endpoint, and/or server 110 may negotiate with each of electronic devices 102, 103 in order to transition electronic devices 102, 103 to operating as the multi-head endpoint.

For example, electronic devices 102, 103 may establish a direct peer-to-peer connection through one or more communication interfaces, such as a Bluetooth interface, an infrared interface, a near field communication interface, a wireless interface, or generally any communication interface capable of establishing a direct peer-to-peer connection. Once the peer-to-peer connection is established, electronic devices 102, 103 may collaborate with one another to optimize the transmission of audio and/or video streams to and/or from server 110. In one instance, electronic devices 102, 103 may analyze one or more characteristics of the network connections used to communicate with server 110, such as uplink bandwidth availability, downlink bandwidth availability, channel conditions, or generally any characteristic that may affect the network connections. Electronic devices 102, 103 may then collaborate with one another over the peer-to-peer connection in order to adaptively switch between the network connections of electronic devices 102, 103 for transmissions to server 110, based on the aforementioned characteristics of the network connections, while participating in the multimedia conference.

Figure 4:
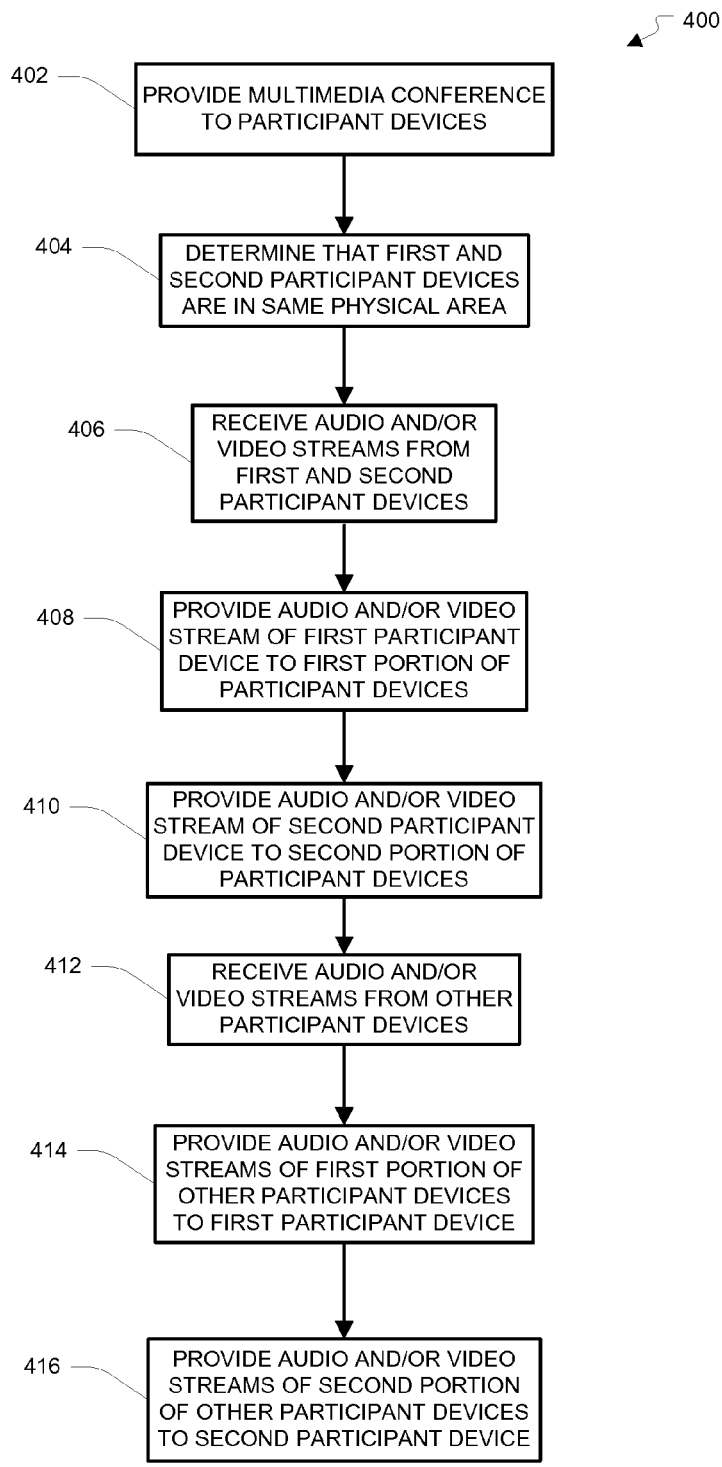
FIG. 4 illustrates a flow diagram of an example process for ad hoc endpoint device association for multimedia conferencing.

FIG. 4 illustrates a flow diagram of an example process 400 for ad hoc endpoint device association for multimedia conferencing. For explanatory purposes, example process 400 is described herein with reference to the example network environment 100 of FIG. 1; however, example process 400 is not limited to the example network environment 100 of FIG. 1. Further for explanatory purposes, the blocks of example process 400 are described herein as occurring in serial, or linearly. However, multiple blocks of example process 400 may occur in parallel.

In block 402, a hosting device, such as server 110, provides a multimedia conference, or other hosted service, to one or more participant devices, such as electronic devices 102, 103, 104, 106. For example, electronic devices 102, 103, 104, 106 may each establish an individual multimedia conference session with server 110. Server 110 may then receive audio and/or video streams from one or more of electronic devices 102, 103, 104, 106 and server 110 may provide, or prepare to provide, the received audio and/or video streams to the other electronic devices 102, 103, 104, 106.

In one example, server 110 may prepare to provide a set of audio and/or video streams to electronic device 102 that includes audio and/or video streams that correspond to, or are associated with, electronic devices 103, 104, 106. Server 110 may also prepare to provide a set of audio and/or video streams to electronic device 103 that includes audio and/or video streams that correspond to electronic devices 102, 104, 106. Server 110 may also prepare to provide a set of audio and/or video streams to electronic device 104 that includes audio and/or video streams that correspond to electronic devices 102, 103, 106. Lastly, server 110 may prepare to provide a set of audio and/or video streams to electronic device 106 that includes audio and/or video streams that correspond to electronic devices 102, 103, 104.

In block 404, server 110 determines that at least a first participant device and a second participant device in the multimedia conference, such as electronic devices 102, 103, are located in the same physical area. For example, server 110 may determine that electronic devices 102, 103 are in the same physical area by analyzing geolocations of electronic devices 102, 103 and/or by analyzing the audio and/or video streams received from electronic devices 102, 103 to determine whether the audio and/or video streams include overlapping content, e.g. whether both of the audio streams include the same audio objects, or whether both of the video streams include the same video objects.

In block 406, server 110 receives an audio and/or video stream from the first participant device, such as electronic device 102 and may receive an audio and/or video stream from the second participant device, such as electronic device 103. In block 408, server 110 provides the audio and/or video stream of the first participant device, such as electronic device 102, to a first portion of the other electronic devices 104, 106, such as to electronic device 104. In block 410, server 110 provides the audio and/or video stream of the second participant device, such as electronic device 103, to a second portion of the other electronic devices 104, 106 that is distinct from the first portion of electronic devices 104, 106, such as to electronic device 106. In other words, server 110 may modify the set of audio and/or video streams provided to, or prepared to be provided to, electronic device 104 to exclude the audio and/or video streams corresponding to electronic device 103 and server 110 may modify the set of audio and/or video streams provided to, or prepared to be provided to, electronic device 106 to exclude the audio and/or video streams corresponding to electronic device 102.

Since electronic devices 102, 103 are in the same physical area, the users interacting with electronic devices 102, 103 may be audible and/or visible from the audio and/or video stream of either of the electronic devices 102, 103. Thus, server 110 may be able to conserve the bandwidth utilized by the multimedia conference by transmitting only the audio and/or video stream of one of electronic devices 102, 103 to each of the other electronic devices 104, 106. In one example, server 110 may process the audio and/or video streams of electronic devices 102, 103 to verify that the users interacting with electronic devices 102, 103 are audible and/or visible from the streams transmitted by both electronic devices 102, 103.

In block 412, server 110 receives audio and/or video streams from the other participant devices, such as electronic devices 104, 106. In block 414, server 110 provides the audio and/or video streams received from the first portion of the electronic devices 104, 106, such as electronic device 104, to the first participant device, such as electronic device 102. In block 416, server 110 provides the audio and/or video streams received from the second portion of the electronic devices 104, 106, such as electronic device 106, to the second participant device, such as electronic device 103. Since electronic devices 102, 103 are in the same physical area, the users interacting with electronic devices 102, 103 may be able to view the display and hear the audio output of both of the electronic devices 102, 103, and may be able to view and hear each other, and therefore may not need to receive audio and/or video streams from each other's electronic devices 102, 103. Thus, in one example, half of the audio and/or video streams corresponding to the other electronic devices 104, 106 may be transmitted to each of electronic devices 102, 103, such that electronic devices 102, 103 may allocate a larger amount of screen space to displaying the received video streams. In other words, in one example server 110 may modify the set of audio and/or video streams provided to, or prepared to be provided to, electronic device 102 to exclude the audio and/or video streams corresponding to electronic devices 103, 106, and server 110 may modify the set of audio and/or video streams provided to, or prepared to be provided to, electronic device 103 to exclude the audio and/or video streams corresponding to electronic devices 102, 104.

Figure 5:
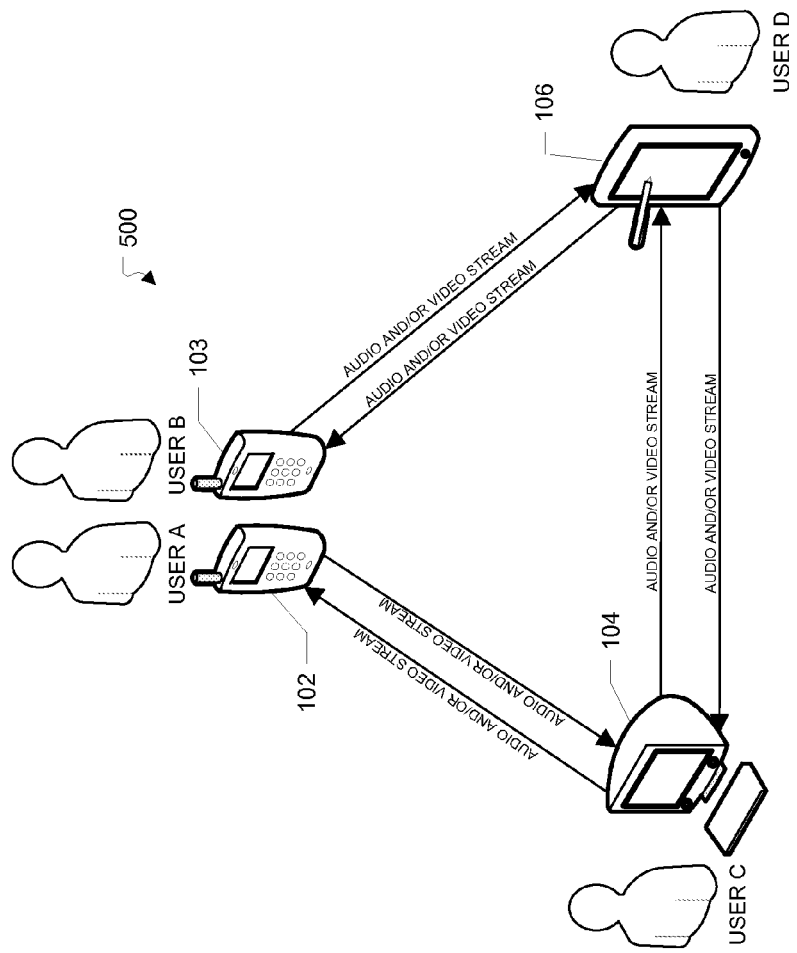
FIG. 5 illustrates an example use case for ad hoc endpoint device association for multimedia conferencing.

FIG. 5 illustrates an example use case 500 for ad hoc endpoint device association for multimedia conferencing. Although the audio and/or video streams of use case 500 are illustrated as being communicated directly between the electronic devices 102, 103, 104, 106, in some instances electronic devices 102, 103, 104, 106 may transmit the audio and/or video streams to server 110 and server 110 may forward the received audio and/or video streams to the other electronic devices 102, 103, 104, 106.

In use case 500, user A is interacting with electronic device 102, user B is interacting with electronic device 103, user C is interacting with electronic device 104, and user D is interacting with electronic device 106. Furthermore, electronic devices 102, 103 are located in the same physical area, and server 110 has generated a location association between electronic devices 102, 103, such that electronic devices 102, 103 may participate in the multimedia conference as a multi-head endpoint.

Since electronic devices 102, 103 are located in the same physical area, users A and B may be able to hear and/or view the audio and/or video streams presented by both electronic devices 102, 103. Thus, electronic device 102 may only receive an audio and/or video stream from electronic device 104, and electronic device 103 may only receive an audio and/or video stream from electronic device 106. In use case 500, electronic device 102 may also receive an audio and/or video stream from electronic device 104, and electronic device 103 may also receive an audio and/or video stream from electronic device 106. In one example, if users A and B can not hear and/or view the audio and/or video streams presented by both electronic devices 102, 103, server 110 may provide the audio and/or video streams of electronic devices 104, 106 to both of electronic devices 102, 103.

Since users A and B may both be audible and/or visible in the audio and/or video streams of each of electronic devices 102, 103, electronic device 104 may only receive audio and/or video streams from electronic devices 102, 106, and electronic device 106 may only receive audio and/or video streams from electronic devices 103, 104. In one example, server 110 may mix the audio streams of electronic devices 102, 103 to generate a stereo audio stream that may be provided to electronic devices 104, 106. Alternatively, if users A and B are not audible and/or visible in the audio and/or video streams of each of electronic devices 102, 103, server 110 may provide the audio and/or video streams of both electronic devices 102, 103 to both of electronic devices 104, 106.

Figure 6:
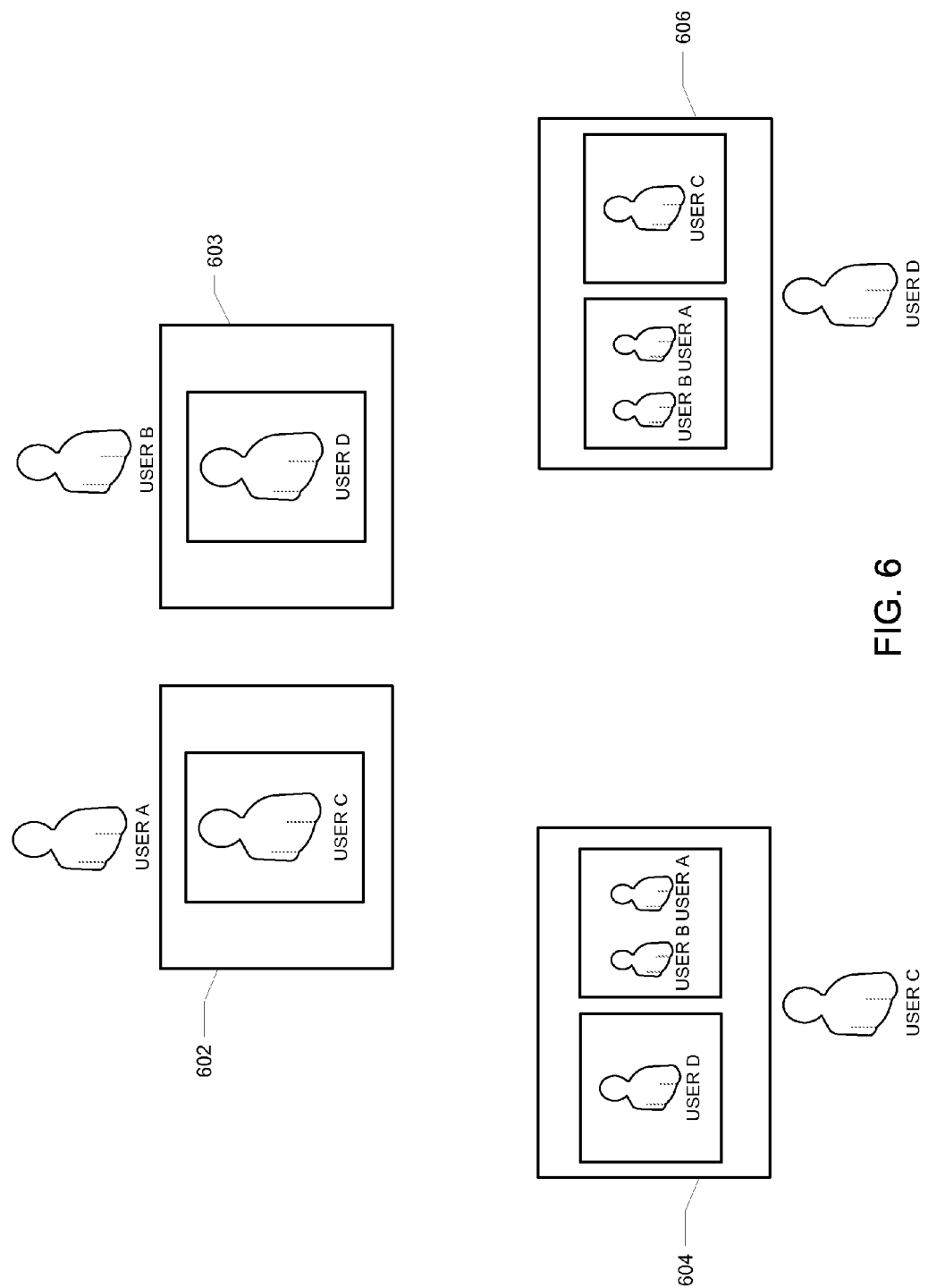
FIG. 6 illustrates example user interfaces for ad hoc endpoint device association for multimedia conferencing.

FIG. 6 illustrates example user interfaces 602, 603, 604, 606 for ad hoc endpoint device association for multimedia conferencing. User interface 602 may be provided on a display of electronic device 102, which may be viewable by both of collocated users A and B. User interface 603 may be provided on a display of electronic device electronic device 103, which may also be viewable by both of collocated users A and B. User interface 604 may be provided on a display of electronic device 104, which may be viewable by user C, and user interface 606 may be provided on a display of electronic device 106, which may be viewable by user D.

As shown in FIG. 6, user interface 602 may display a video stream that includes user C, and user interface 603 may display a video stream that includes user D. Since both user interfaces 602, 603 may be viewable by both of collocated users A and B, each of the video streams that include users C and D only need to be displayed on one of the user interfaces 602, 603. Similarly, if the audio output corresponding to user interfaces 602, 603 is audible to both users A and B, the audio output corresponding to user interface 602 may include an audio stream corresponding to user C, and the audio output corresponding to user interface 603 may include an audio stream corresponding to user D.

User interface 604 displays a video stream that includes user D and a video stream that includes users A and B. The video streams may be arranged on user interface 604 such that the relative positioning of the users in the multimedia conference is maintained. For example, if user A turns towards user interface 603 to speak to user D, user A will also be turning towards the video camera of electronic device 103, and therefore user A will appear, in user interface 604, to be looking towards the video stream of user D.

User interface 606 displays a video stream that includes user C and a video stream that includes users A and B. The video streams may be arranged on user interface 606 such that the relative positioning of the users in the multimedia conference is maintained. For example, if user B turns towards user interface 602 to speak to user C, user B will also be turning towards the video camera of electronic device 102, and therefore user B will appear, in user interface 606, to be looking towards the video stream of user C.

Figure 7:
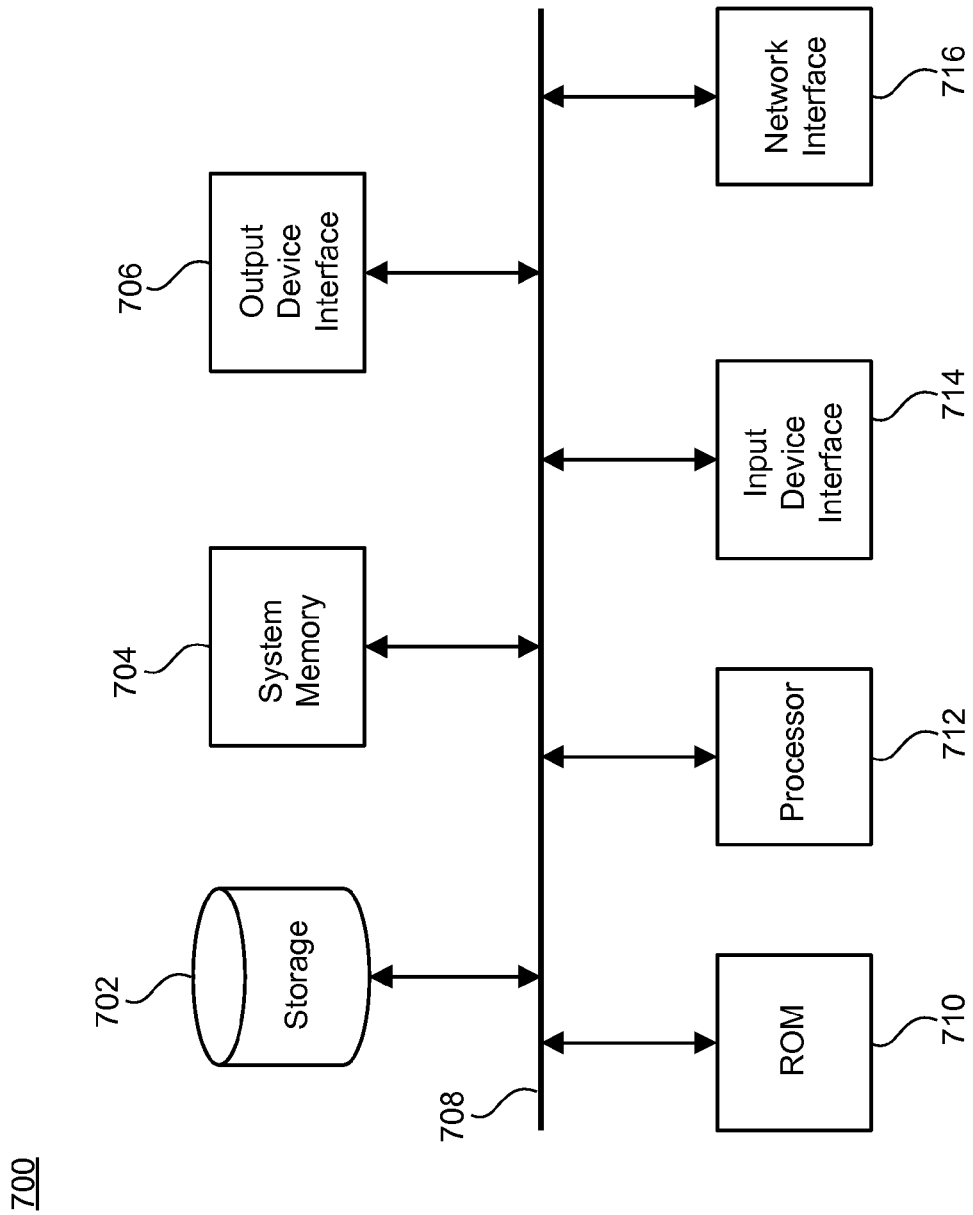
FIG. 7 conceptually illustrates an example electronic system with which some implementations of the subject technology may be implemented.

FIG. 7 conceptually illustrates an example electronic system 700 with which some implementations of the subject technology are implemented. Electronic system 700 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units may include instructions for providing ad hoc endpoint device association for multimedia conferencing in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for ad hoc endpoint device association for multimedia conferencing, the method comprising:

preparing, using one or more computing devices, to provide a first set of video streams corresponding to a multimedia conference to a first participant device, a second set of video streams corresponding to the multimedia conference to a second participant device, a third set of video streams corresponding to the multimedia conference to a third participant device, and a fourth set of video streams corresponding to the multimedia conference to a fourth participant device, wherein the fourth set of video streams comprises a first video stream associated with the first participant device, a second video stream associated with the second participant device, and a third video stream associated with the third participant device, the third set of video streams comprises the first video stream associated with the first participant device, the second video stream associated with the second participant device, and a fourth video stream associated with the fourth participant device, the second set of video streams comprises the first video stream associated with the first participant device, the third video stream associated with the third participant device, and the fourth video stream associated with the fourth participant device, and the first set of video streams comprises the second video stream associated with the second participant device, the third video stream associated with the third participant device, and the fourth video stream associated with the fourth participant device;

determining, using the one or more computing devices, that the first participant device and the second participant device are in a same physical area;

generating, using the one or more computing devices and in response to the determining, a location association between the first participant device and the second participant device for the multimedia conference; and excluding, using the one or more computing devices, the first video stream associated with the first participant device from the fourth set of video streams, the second video stream associated with the second participant device from the third set of video streams, the first video stream associated with the first participant device and the third video stream associated with the third participant device from the second set of video streams, and the second video stream associated with the second participant device and the fourth video stream associated with the fourth participant device from the first set of video streams, based at least in part on the location association between the first participant device and the second participant device.

2. A computer-implemented method for ad hoc endpoint device association for multimedia conferencing, the method comprising:

preparing, using one or more computing devices, to provide a first set of video streams corresponding to a multimedia conference to a first participant device, a second set of video streams corresponding to the multimedia conference to a second participant device, and a third set of video streams corresponding to the multimedia conference to a third participant device, wherein the third set of video streams comprises a first video stream associated with the first participant device and a second video stream associated with the second participant device, the second set of video streams comprises the first video stream associated with the first participant device and a third video stream associated with the third participant device, and the first set of video streams comprises the second video stream associated with the second participant device and the third video stream associated with the third participant device;

determining, using the one or more computing devices, that the first participant device and the second participant device are in a same physical area;

generating, using the one or more computing devices and in response to the determining, a location association between the first participant device and the second participant device for the multimedia conference; and excluding, using the one or more computing devices, the first video stream associated with the first participant device from the third set of video streams based at least in part on the location association between the first participant device and the second participant device.

3. The method of claim 2, further comprising:

excluding, using the one or more computing devices, the third video stream associated with the third participant device from the first set of video streams based at least in part on the location association between the first participant device and the second participant device.

4. The method of claim 3, further comprising:

excluding, using the one or more computing devices, the first video stream associated with the first participant device from the second set of video streams and the second video stream associated with the second participant device from the first set of video streams based at least in part on the location association between the first participant device and the second participant device.

5. The method of claim 2, further comprising:

preparing, using the one or more computing devices, to provide a first set of audio streams corresponding to the multimedia conference to the first participant device, a second set of audio streams corresponding to the multimedia conference to the second participant device, and a third set of audio streams corresponding to the multimedia conference to the third participant device, wherein the third set of audio streams comprises a first audio stream associated with the first participant device and a second audio stream associated with the second participant device, the second set of audio streams comprises the first audio stream associated with the first participant device and a third audio stream associated with the third participant device, and the first set of audio streams comprises the second audio stream associated with the second participant device and the third audio stream associated with the third participant device; and excluding, using the one or more computing devices, the first audio stream associated with the first participant device from the third set of audio streams and the second set of audio streams based at least in part on the location association between the first participant device and the second participant device.

6. The method of claim 5, further comprising:

excluding, using the one or more computing devices, the second audio stream associated with the second participant device and the third audio stream associated with the third participant device from the first set of audio streams based at least in part on the location association between the first participant device and the second participant device.

7. The method of claim 5, wherein the determining, using the one or more computing devices, that the first participant device and the second participant device are in the same physical area further comprises:

determining, using the one or more computing devices, that the first participant device and the second participant device are in the same physical area when the first audio stream associated with the first participant device comprises at least the portion of the second audio stream associated with the second participant device.

8. The method of claim 2, further comprising:
    determining, using the one or more computing devices, whether a first user of the first participant device and a second user of the second participant device are both visible in the first video stream or the second video stream.

9. The method of claim 8, wherein the excluding, using the one or more computing devices, the first video stream associated with the first participant device from the third set of video streams based at least in part on the location association between the first participant device and the second participant device further comprises:
    excluding, using the one or more computing devices, the first video stream associated with the first participant device from the third set of video streams based at least in part on the location association between the first participant device and the second participant device when the first user and the second user are both visible in the second video stream.

10. The method of claim 8, wherein the determining, using the one or more computing devices, that the first participant device and the second participant device are in the same physical area further comprises:
    determining, using the one or more computing devices, that the first participant device and the second participant device are in the same physical area when both the first user and the second user are determined to be visible in either the first video stream or the second video stream.

11. The method of claim 2, further comprising:
    excluding, using the one or more computing devices, the second video stream associated with the second participant device from the third set of video streams based at least in part on the location association between the first participant device and the second participant device;
    combining, using the one or more computing devices, the first video stream associated with the first participant device and the second video stream associated with the second participant device into a composite video stream; and
    adding, using the one or more computing devices, the composite video stream to the third set of video streams based at least in part on the location association between the first participant device and the second participant device.

12. The method of claim 2, wherein the determining, using the one or more computing devices, that the first participant device and the second participant device are in the same physical area further comprises:
    receiving, using the one or more computing devices and over a network, an indication that the first participant device and the second participant device are in the same physical area.

13. The method of claim 2, wherein the determining, using the one or more computing devices, that the first participant device and the second participant device are in the same physical area further comprises:
    determining, using the one or more computing devices, that the first participant device and the second participant device are in the same physical area based on a first geolocation of the first participant device and a second geolocation of the second device.

14. The method of claim 2, wherein the first participant device and the second participant device are operated by a single user.

15. The method of claim 2, wherein the first set of video streams, the second set of video streams, and the third set of video streams each further comprises a fourth video stream associated with a fourth participant device, and further comprising:
    preparing, using the one or more computing devices, to provide a fourth set of video streams corresponding to the multimedia conference to the fourth participant device, wherein the fourth set of video streams comprises the first video stream associated with the first participant device, the second video stream associated with the second participant device, and the third video stream associated with the third participant device.

16. The method of claim 15, further comprising:
    excluding, using the one or more computing devices, the fourth video stream associated with the fourth participant device from the second set of video streams based at least in part on the location association between the first participant device and the second participant device; and
    excluding, using the one or more computing device, the second video stream associated with the second participant device from the fourth set of video streams based at least in part on the location association between the first participant device and the second participant device.

17. A system, comprising:
    one or more processors; and
    a memory including instructions that, when executed by the one or more processors, cause the one or more processors to:
        prepare to provide a first set of video streams corresponding to a multimedia conference to a first participant device, a second set of video streams corresponding to the multimedia conference to a second participant device, and a third set of video streams corresponding to the multimedia conference to a third participant device, wherein the third set of video streams comprises a first video stream associated with the first participant device and a second video stream associated with the second participant device, the second set of video streams comprises the first video stream associated with the first participant device and a third video stream associated with the third participant device, and the first set of video streams comprises the second video stream associated with the second participant device and the third video stream associated with the third participant device;
        determine that the first participant device and the second participant device are in a same physical area;
        generate, in response to the determine, a location association between the first participant device and the second participant device for the multimedia conference; and
        exclude the third video stream associated with the third participant device from the first set of video streams based at least in part on the location association between the first participant device and the second participant device.

18. The system of claim 17, wherein the memory further comprises instructions that, when executed by the one or more processors, cause the one or more processors to:
    exclude the first video stream associated with the first participant device from the third set of video streams based at least in part on the location association between the first participant device and the second participant device.

19. The system of claim 18, wherein the memory further comprises instructions that, when executed by the one or more processors, cause the one or more processors to:

exclude the first video stream associated with the first participant device from the second set of video streams and the second video stream associated with the second participant device from the first set of video streams based at least in part on the location association between the first participant device and the second participant device.

20. The system of claim 17, wherein the memory further comprises instructions that, when executed by the one or more processors, cause the one or more processors to:

determine whether a first user of the first participant device and a second user of the second participant device are visible in both the first video stream associated with the first participant device or the second video stream associated with the second participant device; and determine that the first participant device and the second participant device are in the same physical area when the first user and the second user are both visible in either the first video stream associated with the first participant device or the second video stream associated with the second participant device.

\* \* \* \* \*